May 20, 1941.   R. B. FROST   2,242,645
METHOD AND APPARATUS FOR PERFORATING SHEET MATERIALS
Filed June 8, 1939

INVENTOR.
RAYMOND B. FROST
BY
ATTORNEYS

Patented May 20, 1941

2,242,645

UNITED STATES PATENT OFFICE 2,242,645

METHOD AND APPARATUS FOR PERFORATING SHEET MATERIALS

Raymond B. Frost, Rutherford, N. J., assignor to United States Rubber Company, New York, N. Y., a corporation of New Jersey Application June 8, 1939, Serial No. 278,010

5 Claims. (Cl. 164—125)

This invention relates to an improved method and apparatus for perforating sheet materials, particularly elastic sheet materials such as rubber.

Elastic sheet materials such as rubber are particularly difficult to perforate by the usual methods such as punching or cutting out the material with a sharp instrument, because the rubber tends to flow under the pressure of the cutting instrument and oftentimes results in irregular and improperly shaped openings. Heretofore this difficulty has been avoided by adhering the rubber sheet to a non-elastic backing so as to prevent it from flowing while the perforations are made. Such process involves the extra steps of adhering the rubber to the backing and removing the backing after the perforations are made. Furthermore it is desirable to perforate the rubber while it is in a stretched condition, so that when the tension is released the holes will come closer together. To do this while the rubber is adhered to a non-elastic backing introduces further complications in the process.

In accordance with the present invention elastic or non-elastic materials may be perforated, and elastic sheet materials, such as rubber, may be perforated while stretched or unstretched and without adhering a non-elastic backing thereto. Accordingly regular shaped holes may be formed in the material, and where the material is stretched when the perforations are made, they will be positioned relatively closer together when the tension is released from the sheet. In the present invention a sheet of material in a stretched or unstretched condition is advanced relatively in respect to a plurality of heated elements, and contact is made between the sheet and the elements at spaced points along the sheet, preferably with a sliding movement, and with sufficient pressure to burn holes in the sheet at the desired intervals.

The method and apparatus embodying this invention, the foregoing objects and other features are further described in the following description and the accompanying drawing in which.

This invention is described herein in reference to an apparatus for stretching the material to be perforated and then perforating the material while it is stretched. It will be understood, however, that with slight modifications as hereinafter described, the apparatus may be used for perforating sheet materials while in the unstretched condition.

Figure 1:
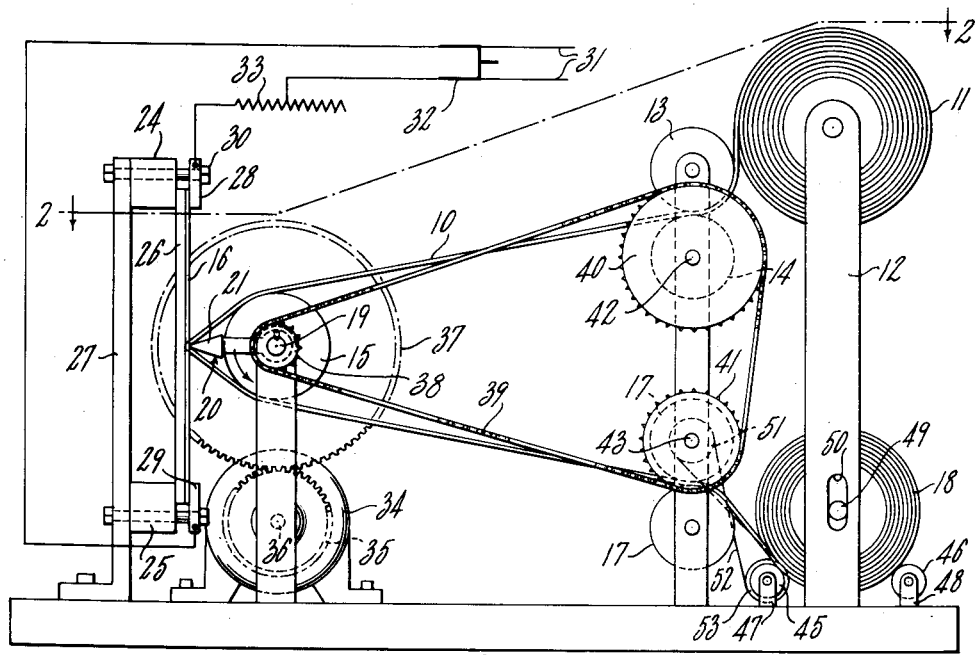
Fig. 1 is a side elevational view of an apparatus illustrating an embodiment of the invention for carrying out the method described herein, and taken from the side looking in the direction of the arrow A in Fig. 2.

Referring to Fig. 1 the sheet material 10 to be perforated is led from a supply roll 11 rotatably supported in a frame 12 and drawn between a pair of driven pinch rolls 13 and 14. The material 10 is then led over a supporting roll 15 adjacent to hot perforating elements 16, and then between a pair of pinch rolls 17 and is then wound up on the wind-up reel 18. The pinch rolls 17 are driven at a greater peripheral speed than that of the pinch rolls 13 and 14 so as to stretch the rubber sheet material 10 as it leaves the pinch rolls 13 and 14 and before it passes over the supporting roll 15 which is rotatably mounted on a shaft 19. The tension on the perforated sheet 10 is released after the sheet passes through the rolls 17 and the perforations are brought closer together by the contraction of the sheet.

Figure 2:
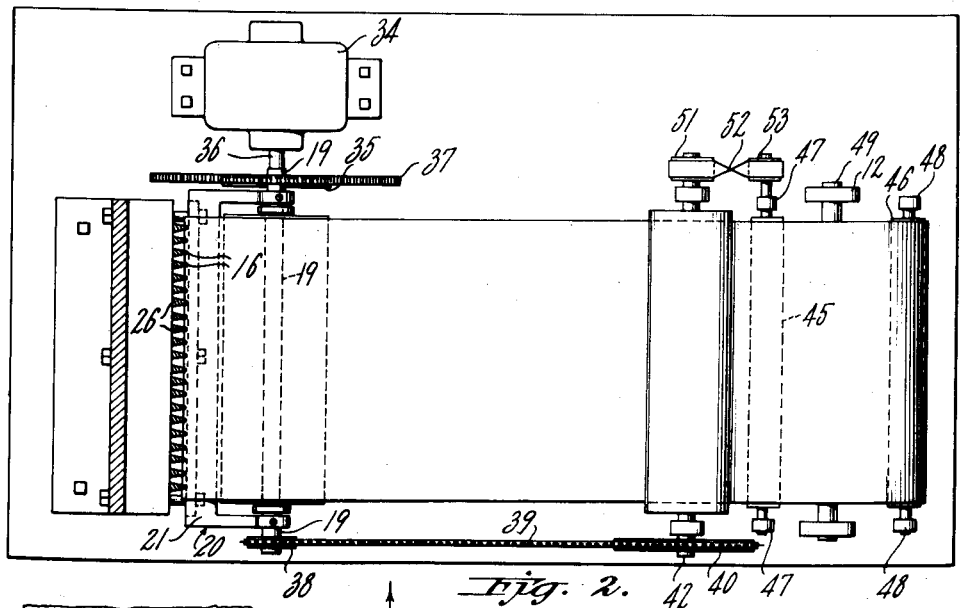
Fig. 2 is in part a plan and sectional view of the apparatus taken on line 2—2 of Fig. 1.
Figure 3:
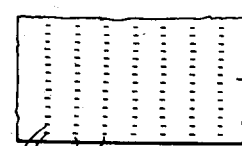
Fig. 3 is a plan view of the material perforated in accordance with the method and by the apparatus described herein.

As shown in Figs. 1 and 2 the perforations are formed in the sheet material 10 by a yoke 20 keyed to the shaft 19 and having a cross head 21 which rotates about the roll 15 in the direction of the arrow and moves the material 10 away from the periphery of the roll 15 and against the heated elements 16 each time the yoke 21 makes a revolution. In this manner a perforation 22 is burned in the sheet material 10 as shown in Fig. 3 by each of the elements 16, and a row 23 of such perforations is formed in the material 10 transversely thereof for each revolution of the head 21 of the yoke.

The distance between the rows 23 of the perforations can be controlled as desired by varying the ratio of the revolutions per minute of the yoke 20 to the linear speed of travel of the material 10, and/or by increasing the number of yokes 20 on the shaft 19 up to at least three in number. It will be understood that the ratio of the speed of the yoke, or yokes 20, to the speed of travel of the material 10 may be changed by changing the gear ratio between the sprocket 38 and the sprockets 40 and 41. The distance between the perforations 22 in each row 23 is controlled by the spacing of the heating elements 16 as shown in Fig. 2.

The heating elements 16 consist of electrically heated resistance wires which are supported between the upper and lower supporting heads 24 and 25 by supports 26 which may be insulated from the wires 16 against passage of current and heat by suitable insulating material. The heads 24 and 25 are supported on a bracket 27 secured to the base of the frame, and the heating elements 16 together with its supporting and insulating material 26 are clamped at each end between the heads 24 and 25 and electrical distributing bars 28 and 29 by means of the nut and bolt connections 30. The distributing bars 28 and 29 may be connected to the electrical supply line 31 by the switch 32. A variable resistance 33 is interposed in the line leading from the switch 32 to the distributing bar 28 in order to regulate or control the amount of current flowing through the electrical heating resisting elements 16 to produce the desired temperature to burn the holes in the material 10.

The moving elements of the apparatus are driven from a motor 34 having a gear 35 keyed to its rotor shaft 36. The gear 35 drives the relatively large gear 37 keyed to the shaft 19 to which the yoke 20 is keyed. A sprocket wheel 38 is keyed to the opposite end of the shaft 19, and drives the sprocket chain 39, which in turn drives the upper pinch rolls 13 and 14 and the lower pinch rolls 17 through the sprockets 40 and 41, respectively. The sprocket 40 is keyed to the shaft 42, to which one of the upper pinch rolls 14 is keyed, and the sprocket 41 is keyed to the shaft 43 to which one of the lower pinch rolls 17 is keyed. As the sprocket gear 41 is smaller than the sprocket gear 40, the rolls 17 are driven at a greater peripheral speed than the upper pinch rolls 13 and 14, and thereby stretches the sheet 10.

The wind-up roll 18 is supported on rollers 45 and 46 rotatably mounted in brackets 47 and 48 extending from the base of the apparatus. The wind-up reel 18 is mounted on a shaft 49 which is secured in slots 50 in the frame 12 so that it may move up and down as the material is wound up after perforation. The wind-up reel 18 is driven from a pulley 51 keyed to the pinch roll shaft 43. A cross belt 52 is driven from the pulley 51 and drives a pulley 53 secured to the shaft upon which the roll 45 is mounted, and thereby drives the wind-up reel 18.

If it is desired to perforate material which is non-elastic, the upper pinch rolls 13 and 14 may be eliminated and the material 10 to be perforated may be drawn from the supply reel 11 and over the supporting roll 15 by the pinch rolls 17. The perforated material may then be wound up on the wind-up reel 18, as illustrated. If the apparatus is so modified the material 10 will not be stretched, and the yoke 20 will be free to rotate around the supporting roll 15 and any extra length of material between the roll 15 and the supply reel 11 which may be required, by virtue of the head of the yoke extending beyond the periphery of the supporting roll 15, may be obtained by drawing the material directly from the supply reel 11.

While certain forms of this invention have been described and shown herein it will be understood that such forms may be changed without departing from the spirit of the invention and the scope of the appended claims.

Having thus described my invention, what I claim and desire to protect by Letters Patent is:

1. The method of perforating sheet material comprising the steps of advancing the sheet material relatively in respect to a plurality of heated elements, and at spaced points along the sheet forming contacts between the sheet and the heated elements and producing a sliding movement along the surface of said sheet between said elements and said sheet with sufficient pressure to cause holes to be burned in said sheet.

2. The method of perforating elastic sheet material comprising the steps of stretching the material so as to substantially elongate same, advancing the sheet material relatively in respect to a plurality of heated elements, at spaced points along the sheet forming contacts between the stretched sheet and the heated elements with sufficient pressure to cause holes to be burned in said sheet, and releasing the tension on the sheet so as to permit same to contract and reduce the distance between the holes therein.

3. An apparatus for perforating elastic sheet material, said apparatus comprising a plurality of elongated elements adapted to be heated, means for stretching said sheet material so as to substantially elongate same, means for advancing said sheet adjacent to said elements, and a member having a narrow edge extending transversely of said elements adapted to contact with said sheet and move same against said elements at spaced positions so as to burn holes in said sheet.

4. An apparatus for perforating elastic sheet material, said apparatus comprising means for stretching and advancing the sheet over a support so as to substantially elongate same, elongated electrical resistance heating elements positioned adjacent to said support and extending generally in the advancing direction of the sheet, and a member having a narrow edge extending transversely of said elements adapted to contact with said sheet and move same from said support and carry the sheet in its advancing direction against the elongated resistance elements.

5. An apparatus for perforating sheet material, said apparatus comprising a plurality of relatively straight elongated elements adapted to be heated, a roll extending transversely of said elements and adjacent thereto, means for advancing a sheet of material over said roll, a member extending axially of said roll and adapted to rotate therearound and move said sheet material into contact with said elements.

RAYMOND B. FROST.